US012645787B2

(12) United States Patent
Strogov et al.

(10) Patent No.: US 12,645,787 B2
(45) Date of Patent: Jun. 2, 2026

(54) STACK TRACE ANALYSIS MODEL

(71) Applicant: Acronis International GmbH,
Schaffhausen (CH)

(72) Inventors: Vladimir Strogov, Singapore (SG);
Sergey Ulasen, Singapore (SG);
Aliaksei Dodz, Singapore (SG); **Serg
Bell, Costa del Sol (SG); Stanislav
Protasov**, Singapore (SG)

(73) Assignee: Acronis International GmbH,
Schaffhausen (CH)

( * ) Notice: Subject to any disclaimer, the term of this
patent is extended or adjusted under 35
U.S.C. 154(b) by 234 days.

(21) Appl. No.: 18/345,085

(22) Filed: Jun. 30, 2023

(65) Prior Publication Data

US 2025/0005142 A1     Jan. 2, 2025

(51) Int. Cl.
  *G06F 21/54*       (2013.01)
  *G06F 21/55*       (2013.01)
  *G06F 21/56*       (2013.01)
(52) U.S. Cl.
  CPC ............ *G06F 21/552* (2013.01); *G06F 21/54*
  (2013.01); *G06F 21/564* (2013.01)
(58) Field of Classification Search
  CPC ....... G06F 21/552; G06F 21/54; G06F 21/564
  See application file for complete search history.

(56) References Cited

U.S. PATENT DOCUMENTS

| | | | | |
|---|---|---|---|---|
| 8,205,257 B1 * | 6/2012 | Satish | ................... | G06F 21/577 |
| | | | | 726/25 |
| 11,416,603 B2 | 8/2022 | Zhang et al. | | |
| 11,416,612 B2 | 8/2022 | Strogov et al. | | |
| 11,494,491 B2 | 11/2022 | Strogov et al. | | |
| 11,586,736 B2 | 2/2023 | Strogov et al. | | |
| 2018/0351968 A1 * | 12/2018 | MacLeod | .............. | G06F 21/568 |
| 2019/0205530 A1 * | 7/2019 | Brown | ................... | G06F 21/566 |
| 2019/0286821 A1 * | 9/2019 | Strogov | ............... | G06F 21/568 |
| 2020/0137085 A1 * | 4/2020 | Kostyushko | ........... | G06F 21/53 |
| 2021/0326436 A1 * | 10/2021 | West | ..................... | G06F 21/567 |
| 2021/0326438 A1 * | 10/2021 | Dichiu | .................. | G06F 21/552 |
| 2022/0207139 A1 | 6/2022 | Strogov et al. | | |
| 2022/0237764 A1 * | 7/2022 | Mullet | .................. | G06Q 50/16 |
| 2024/0086536 A1 * | 3/2024 | Rosen | .................. | G06F 21/566 |
| 2024/0296222 A1 * | 9/2024 | Portase | .................. | G06F 21/56 |

* cited by examiner

Primary Examiner — Trong H Nguyen
Assistant Examiner — Samikshya Poudel
(74) Attorney, Agent, or Firm — ESPE Legal Consultancy
FZ-LLC

(57)                ABSTRACT

Systems and methods for detecting a malware injection
interested processes. The method includes identifying one or
more trusted processes, monitoring at least one thread asso-
ciated with the trusted processes using at least one control
point, detecting activity at the at least one thread based on
the at least one control point and determining a timestamp of
the detected activity, receiving from the trusted processes at
least one execution stack corresponding to the timestamp
and indicating the at least one control point used to monitor
the at least one thread, applying a first malware detector to
the at least one execution stack to generate a first verdict,
collecting the first verdict and auxiliary information corre-
sponding to the trusted processes at the given timestamp,
and applying a second malware detector to the first verdict
and the auxiliary information to generate a second verdict.

20 Claims, 4 Drawing Sheets

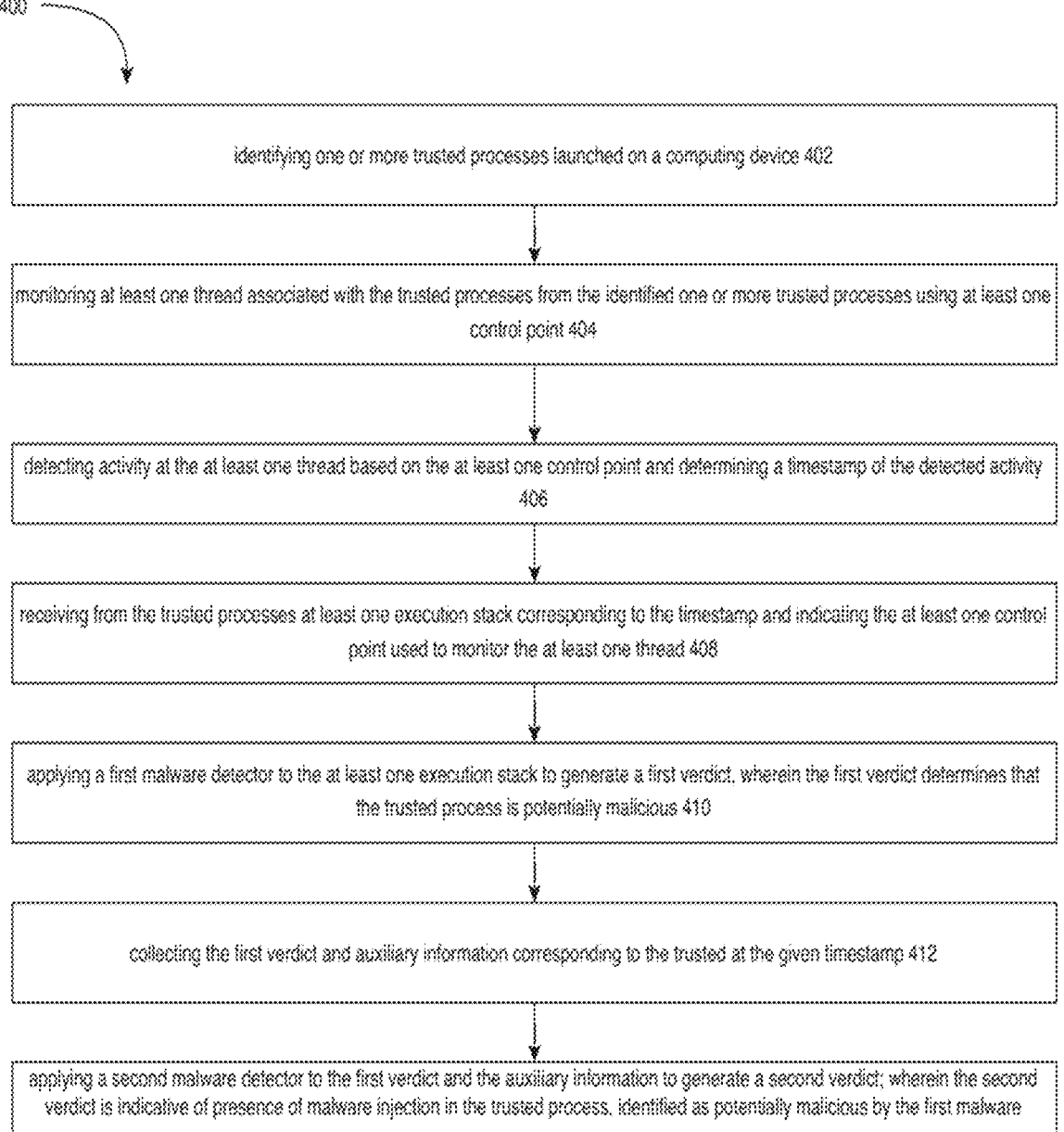

400 identifying one or more trusted processes launched on a computing device 402 monitoring at least one thread associated with the trusted processes from the identified one or more trusted processes using at least one control point 404 detecting activity at the at least one thread based on the at least one control point and determining a timestamp of the detected activity 406 receiving from the trusted processes at least one execution stack corresponding to the timestamp and indicating the at least one control point used to monitor the at least one thread 408 applying a first malware detector to the at least one execution stack to generate a first verdict, wherein the first verdict determines that the trusted process is potentially malicious 410 collecting the first verdict and auxiliary information corresponding to the trusted at the given timestamp 412 applying a second malware detector to the first verdict and the auxiliary information to generate a second verdict; wherein the second verdict is indicative of presence of malware injection in the trusted process, identified as potentially malicious by the first malware detector 414

FIG. 4

STACK TRACE ANALYSIS MODEL

TECHNICAL FIELD

The present disclosure relates to the field of computer security. More specifically, the present disclosure relates to the detection and remediation of malware code injections in multiple trusted processes.

BACKGROUND

Malicious software, or malware, can infiltrate or damage a computer system by corrupting software code, resulting in abnormal operation or even termination of applications and the operating system. Conventional malware detection techniques, such as static and dynamic analysis, have several drawbacks, including being ineffective in situations where the active malware has been significantly modified or obfuscated from previous known versions, or in situations where the active malware has not been previously analysed or even seen before, as is the case with zero-day attacks.

One of the conventional signs by which a process is qualified as dangerous or safe/trusted is the presence or absence of a valid digital signature. However, there is a danger that a malicious process may run inside a known trusted process, resulting in the injection of malicious code that can corrupt or even encrypt user data. This problem of protection from "injected" malware has been deemed more complex than the definition of independent malicious processes.

Even more dangerous are malicious injectors that target multiple processes rather than only one at any given time. This is because taking remediating action on a single process of a plurality of malicious processes will not resolve the security issue. For a complete resolution, all processes in the plurality of malicious processes need remediation actions. However, considering processes one at a time in a vacuum for whether the processes are malicious may lead to false positives/negatives.

Existing solutions have limitations. Machine learning (ML) approaches have been used to classify and make preliminary detections based on injected call stacks. However, the final detection and remediation have been based on heuristics, which may not always be effective.

Therefore, there is a need for more effective systems and methods that can consider multiple processes and analyze the respective injected call stack, and also generate the primary detection and the final detection.

SUMMARY

Embodiments described or otherwise contemplated herein substantially meet the aforementioned needs of the industry. The present disclosure relates to a system and a computer-implemented method for detection and remediation of malware code injections in multiple trusted processes.

In one embodiment, a method is provided for detecting a malware injection in a trusted process. The method includes identifying one or more trusted processes launched on a computing device, monitoring at least one thread associated with the trusted processes from the identified one or more trusted processes using at least one control point, detecting activity at the at least one thread based on the at least one control point and determining a timestamp of the detected activity, receiving from the trusted processes at least one execution stack corresponding to the timestamp and indicating the at least one control point used to monitor the at least one thread, applying a first machine learning module of the first malware detector to the at least one execution stack to generate a first verdict. The first verdict determines that the trusted process is potentially malicious. The method further includes collecting the first verdict and auxiliary information corresponding to the trusted processes at the given timestamp and applying a second machine learning module of the second malware detector to the first verdict to generate a second verdict. The second verdict is indicative of presence of malware injection in the trusted process identified as potentially malicious by the first malware detector.

In some embodiments, the method further includes training the first malware detector continuously to identify potential malware injection based on newly collected data corresponding to detected potential malware injections, wherein the first malware detector is based on a machine learning module and training the second malware detector continuously to confirm the presence of malware injection based on newly collected data corresponding to confirmed malware injections. The second malware detector is based on a machine learning module.

In some embodiments, the method further includes providing respective first verdict and auxiliary information corresponding to each of two or more trusted processes, from amongst the identified trusted processes, in a series. The series is formed of an order of the timestamp corresponding to each trusted process.

In some embodiments, the method further includes determining a remedial action based on the auxiliary information and the second verdict, by applying a third machine learning module of the second malware detector, in response to the second verdict.

In some embodiments, the remedial action comprises file rollback, registry rollback, scheduled tasks rollback, remote registry rollback modified by the trusted process and termination of the identified malicious process.

In some embodiments, the method further includes generating an alert to a user and providing the user with the second verdict and collected auxiliary information to remediate files, file paths, scheduled tasks and registry data modified by the trusted processes.

In some embodiments, auxiliary information comprising File I/O, Registry I/O data, RPC calls, LPC data, scheduled tasks, COM servers data, network activity data, intercepted API data.

In some embodiments, the method further includes monitoring of the at least one thread associated with the trusted process is performed using call stack trace monitoring, and the at least one control point is associated with events comprising at least one of: create a file, clean up a file, close a file, duplicate a handle, rename a file, delete a file, create a thread, registry operations, COM operations, RPC call and LPC call.

In some embodiments, the method further includes repeating method operations of the detecting activity, the receiving the at least one execution stack, the applying the first machine learning module, the collecting the first verdict and the auxiliary information, and the applying the second machine learning module at a predefined frequency based on predefined rules.

In some embodiments, the method further includes identifying the process as malicious if the second verdict is higher than a first predefined threshold, and detecting false positive if the second verdict of the malicious behavior of the trusted processes is lower than a second predefined threshold.

In an embodiment, the malware detection system is configured to detect a malware injection in a trusted process. The system comprises a hardware processor which is implemented on a computing device. The hardware processor is configured to identify one or more trusted processes launched on the computing device, monitor at least one thread associated with the trusted processes from the identified one or more trusted processes using at least one control point, detect activity at the at least one thread based on the at least one control point and determine a timestamp of the detected activity, receive from the trusted processes at least one execution stack corresponding to the timestamp and indicating the at least one control point used to monitor the at least one thread, and apply a first malware detector to the at least one execution stack to generate a first verdict. The first verdict determines that the trusted process is potentially malicious. The hardware processor is further configured to collect the first verdict and auxiliary information corresponding to the trusted process at the given timestamp and apply a second malware detector to the first verdict and the auxiliary information to generate a second verdict. The second verdict is indicative of presence of malware injection in the trusted process identified as potentially malicious by the first malware detector.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 4 is a flowchart of a method for detecting a malware injection in a trusted process, in accordance with an embodiment.

Figure 1:
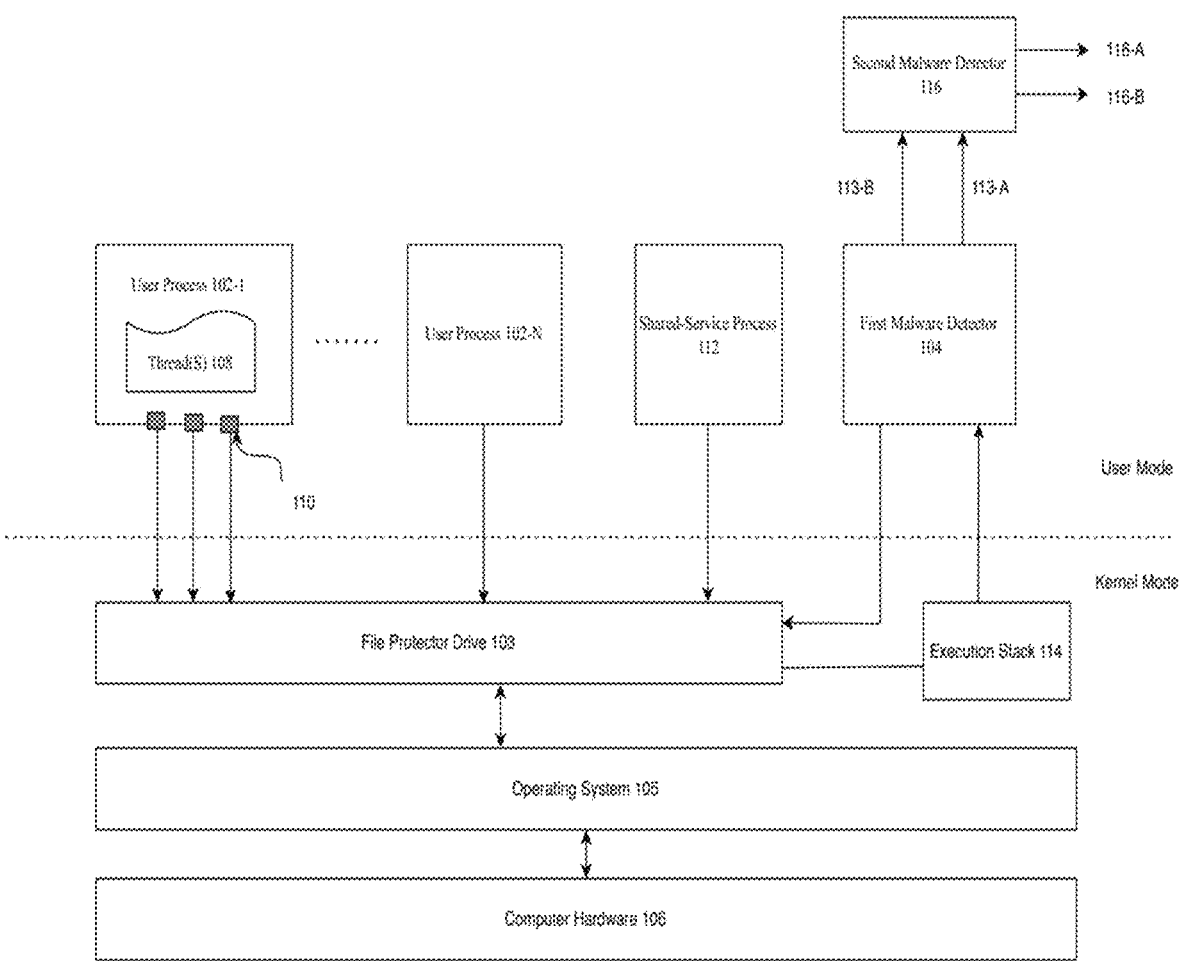
FIG. 1 is a block diagram of a system, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

The present disclosure is directed to effective malware detection by machine learning based complete detection and remediation of malware code injections in trusted processes. The present disclosure utilizes a combination of at least two machine learning modules to detect and remediate malware code injections in a more effective and efficient manner.

FIG. 1 is a block diagram of a system 100 for detecting a malicious application, according to one embodiment. The system 100 includes a computer hardware 106 that supports execution of one or more user-level processes 102 or an OS thread processes executing in an operating system (OS) environment provided by an operating system 105. Each user process 102 may be associated with a user application. For example, the user process 102 may be part of the user application or be considered an instance of the user application itself. In some cases, the user application is a malicious application, such as malware, configured to infiltrate the operating system 105 or damage the system 100 by corrupting software code, resulting in abnormal operation or termination of applications and the operating system 105, or unauthorized modification of user data on the system 100.

The system 100 further supports execution of at least one shared-service process 112 in parallel with the user processes 102. A shared-service process refers to a specialized process configured to be shared by a plurality of services to conserve resource consumption of the computing hardware 106, as grouping multiple services into a single process can conserve resources. In an embodiment, the shared-service process 112 is configured to allow third-party programs or processes to be embedded in the shared-service process as separate threads. In another embodiment, services running in the shared-service process are implemented as dynamically-linked libraries (DLLs) imported into the main process. One example of a shared-service process 112 is a Service Host process (also referred to as "SvcHost" or "svchost.exe"), found on WINDOWS operating systems and configured to host internal WINDOWS services and other services. As the shared-service process 112 is typically a known process used for hosting internal services of the operating system 105, the shared-service process 112 can often be characterized as a "trusted" or "safe" process in terms of computer security. However, some malicious applications (i.e., "malware") may exploit such main processes that allow third-party programs or processes to be embedded in the main process as separate threads, as shown in FIGS. 2A and 2B.

Figure 2A:
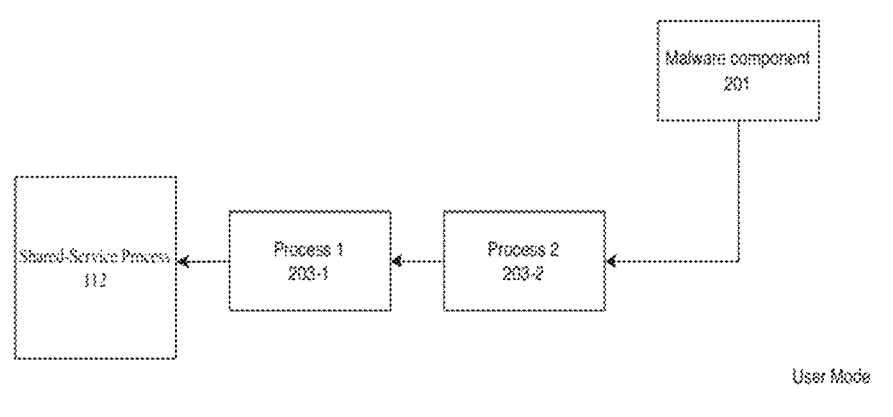
FIGS. 2A and 2B are block diagrams of operations of a malware component injecting its processes into a shared-service process, in accordance an embodiment.
Figure 2B:
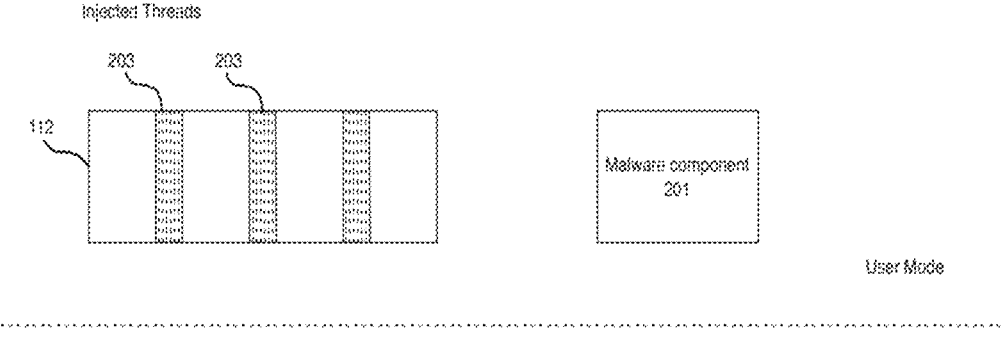

Referring further to FIGS. 2A and 2B, block diagrams of operations of a malware component 201 injecting its processes into a shared-service process 112 are depicted, according to an embodiment. As shown in FIG. 2A, malware component 201 can be a malicious application executing on the system 100. Malware component 201 as a malicious application may launch one or more processes 203 ("Process1" 203-1, "Process2" 203-2). The processes 203 may contain instructions for maliciously altering operation of the system 100, instructions for transferring control of a processor to another process that contains the malicious behavior, or other instructions that facilitate the behavior of the malware component 201.

The malware component 201 may then allocate space within the address space of the shared-service process 112. For example, the malware component 201 may invoke a system call of the operating system 105 that changes a state of a region of memory within the virtual address space of a specified process. In aspects using a WINDOWS-based system, the malware component 201 may call a memory management function (e.g., "VirtualAllocEx( )") to allocate a region within the virtual address space of the shared-service process 112, using parameters such as a handle to the shared-service process 112, a pointer to some region within the shared-service process 112, and a size of the malicious process 203.

After that, the malware component 201 writes one or more processes 203 including the execution state (e.g., execution stack) and other data related to the process 203. In one aspect, the malware component 201 may use a system call configured to write data to an area of memory in a specified process, such as "WriteProcessMemory( )" or "WriteVirtualMemory( )" functions in a WINDOWS-based system. As shown in FIG. 2B, the malware component 201 may then invoke a thread inside the process 112, for example, using a createRemoteThread( ) function configured to create a thread that runs in the virtual address space of another thread. As a result, the shared-service process 112 is injected with one or more malicious threads corresponding to the malicious processes. Although an example of injections in shared-service process 112 is provided, it should be noted that processes may also be injected into normal processes, such as user process 102.

Referring back to FIG. 1, the system 100 includes a driver module, referred to as a file protector driver 103, and a first malware detector 104 configured to detect injections of such code into trusted processes, such as the shared-service process 112 and user process 102. In one embodiment, the file protector driver 103 is configured to monitor the operations of one or more user processes 102 executing in the system, including any thread, and flag any activity that modifies user data or execution state of other processes, such as shared-service process 112 and other user processes 102.

The first malware detector 104 is configured to analyze the execution state and behavior of the monitored user processes, such as the execution state as captured by their respective execution stacks, using machine learning techniques. For example, the first malware detector 104 may include a heuristics database or one or more models trained on previous execution stacks and configured to probabilistically identify user processes and threads that may be malicious based on their execution state. In one implementation, the first malware detector 104 is configured to perform ensemble classification of the execution state and behavior of monitored user processes. This is accomplished by using various techniques, such as taking the mode of the classifications produced by multiple models, taking the average of the classifications produced by multiple models, weighting the votes of the models according to their performance, considering the probabilities or confidence scores associated with each class output by the individual model. The final classification is then determined using one of these approaches. This provides a robust and accurate assessment of the execution state and behavior of the monitored processes.

In some implementations, the first malware detector 104 is configured to execute a "random forests" algorithm for classifying the execution state and behavior of the monitored user processes, a gradient boosted decision-tree based algorithm, for example, LightBGM, XGBOOST, or other suitable ensemble learning methods.

In one implementation, the file protector driver 103 may be configured to detect when processes 102 have been launched on the system 100. Whenever any new processes have been started in the system, the file protector driver 103 may be configured to constantly monitor all threads 108 in those new processes. In one implementation, the file protector driver 103 is configured to identify one or more trusted processes. In some implementations, the file protector driver 103 is configured to perform call stack trace or execution stack trace monitoring on one or more control points 110 (as shown in FIG. 1) of a thread associated with the one or more trusted processes. According to the embodiment, the file protector driver 103 is selected as an element to analyze at the point of execution of certain file operations and other operations that the file protector driver 103 intercepts, thereby covering all sources of malicious threads, regardless of their origin, under the approach that the target of the operation matters rather than the source of the malicious thread. In other words, by intercepting at the target rather than at the source(s), all sources of malicious operations can be captured.

In some implementations, the control points 110, on which call stack trace or execution stack trace monitoring is performed, are associated with the following events or activities of the process 102, including file creation, file cleanup, file close, handle deprecation, file renaming, file deletion, thread creation, writing to virtual memory, and other file-related or memory-related events. In some implementations, the control points 110 correspond to system calls exposed by the operating system 105 for performing the above-described events or activities, such as "CreateFile( )", "DeleteFile( )", "CreateThread( )", "CreateRemoteThread( )", and "WriteVirtualMemory( )". In an aspect, at least one of the control points 110 is associated with a system call (e.g., "CreateRemoteThread( )") to create a remote thread that runs in a virtual address space of another process, such as the shared-server process 112.

In an aspect, the file protector driver 103 is configured to receive (e.g., from the process 102) an execution stack 114 for a specified control point(s) 110. The execution stack 114, also referred to as a call stack, is a data structure used by the operating system 105 to store and manage data values related to the execution state of the thread 108. In one aspect, the execution stack 114 is implemented as a stack-based data structure onto which a process (that is calling a sub-routine) "pushes" a data value indicating a return address onto the stack 114. When the sub-routine finishes execution, the sub-routine "pops" or pulls the return address off the execution stack and transfers control to the instructions at that return address. In an aspect, the execution stack 114 includes one or more stack frames containing local variable storage associated with a routine of the thread 108, return addresses, for example, a frame pointer, back to a routine's caller, and parameter values passed to the routine. In some embodiments, the execution stack 114 is associated with a particular thread 108 of the process 102. In other embodiments, the execution stack 114 is associated with the entire process 102, which may include a plurality of threads 108 and their corresponding execution stacks. In one aspect, the plurality of values stored in the execution stack 114 at a given time (e.g., return addresses, parameters, local variables, etc.) provide an input data set that can be analyzed using machine learning to identify tendencies and patterns indicating of malicious software using attack vectors such as shared-service processes. Accordingly, aspects of the present disclosure are able to use stack-based classification which are suitable for unknown threats that inject malicious threads into trusted processes, which is a capability that traditional virus scanning is unable to provide.

In one aspect, in response to detecting activity on the one or more control points 110 of a process 102, the file protector driver 103 is configured to generate a first verdict 113-A that the execution of the process 102 is malicious by applying the first malware detector 104 to receive the execution stack 114. In an aspect, in case of any activity on a particular checkpoint, the file protector driver 103 transmits the execution stack 114 to the first malware detector 104. In turn, the first malware detector 104 is configured to generate a probabilistic prediction of whether the process 102 is malicious based on the data values and properties contained in the execution stack 114. In some embodiments, the first malware detector 104 uses string values of the call stack frames as columns of data, to which a random forests decision tree algorithm or other suitable algorithm is applied. In an aspect, the first verdict 113-A, generated by the first malware detector 104, represents a probabilistic estimate of the danger of this thread. For example, a predefined threshold indicating the danger limit is defined based on various security factors. Then, the first verdict 113-A is compared with the predefined threshold. If the probabilistic value of the first verdict 113-A exceeds the predefined threshold, the process 102 is identified as potentially malicious. If the probabilistic value of the first verdict 113-A is within the predefined threshold limit, the process 102 is identified as "safe".

In accordance with an embodiment, if the process is identified as potentially malicious by the first malware detector 104, then a second malware detector 116 is applied to the first verdict 113-A and auxiliary information 113-B associated with the potentially malicious processes to generate a second verdict 116-A. The second verdict 116-A is indicative of a presence of malware injection in the trusted process, identified as potentially malicious by the first malware detector 104. In an embodiment, a false positive can be detected if the second verdict 116-A is lower than a second predefined threshold (e.g. false positive threshold). According to one aspect of the present disclosure, the auxiliary information 113-B includes, but may not be limited to, File Input/Output (File I/O), Registry I/O data, Remote Procedure Call (RPC), Local Procedural Calls (LPC) data, scheduled tasks, Component Object Model (COM) servers data, network activity data, intercepted Application Programming Interface (API) data.

File I/O is the process of reading data from and writing data to files on a computer's storage system. File I/O data contains details of reading, writing, opening, closing, and appending processes. Registry I/O data holds information about registers used during the process of exchanging data between I/O devices and the computing device. Examples of registers include accumulators, data registers, address registers, program counters, memory and data registers, index registers, and memory buffer registers. RPC data contains details of RPC protocol, which is generally used to communicate between processes on different workstations or the same workstation. LPC is the feature for threads to synchronize and communicate when a memory is not shared. LPC data contains details of exchange messages in synchronous and asynchronous communication modes via ports. Data related to scheduled tasks share the details about a schedule of the task without any dependency. A data server defines the physical connection to a database or a cube. A data server connection specifies the parameters that are needed to connect to the database or cube, such as the location of the database and the timeout duration. A COM server is an object that provides services to clients. The services are in the form of COM interface implementations that can be called by any client. The client is returned a pointer to one of the interfaces on the server object. The COM server data contains the information relating the services provided by COM server, in-process or out-process. In-process servers are implemented in a dynamic linked library (DLL), and out-of-process servers are implemented in an executable file (EXE). Interceptor is an API gateway server built for accepting API requests from the client applications and routing them to the appropriate backend services. The interceptor API data contains information related to API requests, such as HTTP requests.

Referring back to FIG. 1, the first verdict 113-A generated by the first malware detector 104 is applied to the second malware detector 116. In one embodiment, the first verdict is generated based on execution stack 114 of each trusted process from amongst one or more trusted processes. The first verdict 113-A corresponding to each trusted process is provided to the second malware detector 116 in series during a predefined time duration. This implementation is described in detail in reference with FIG. 3 below.

According to an embodiment, the first malware detector 104 and the second malware detector 116 are configured and trained based on a heuristic database and previous execution stacks. In one aspect, the first malware detector 104 and the second malware detector 116 are further updated continuously over the time axis with newly collected data from current monitoring and detection of malwares. Continuous updating with new data renders the system more accurate in terms of malware detection and corresponding remediations.

In some implementation, the second malware detector 116 is configured to generate and perform one or more remedial actions based on the evaluation results, i.e., the second verdict 116-A, generated by the second malware detector 116 and auxiliary information 113-B associated with the potentially malicious processes. The third machine learning module, alternatively referred as to the third ML classifier, is applied to the auxiliary information 113-B and the second verdict 116-A to generate remedial action 116-B. For example, in response to the second verdict 116-A indicating that the user process 102 is malicious, the second malware detector 116 communicates with the file protector driver 103 to apply remediation. For example, the file protector driver 103 may restore all modifications made by the injected threads that had been identified using control points 110, for example, using a version stored in a backup, and the injected threads are terminated by the agents after their detection. Other "healthy" threads of the shared-service process continue their execution, i.e., the system remains fully functional after this remedial action 116-B. In another example, in response to a generated indication that the user process 102 is malicious based on an execution stack associated with a control point 110 for file deletion or file writes, the file protector driver 103 may restore an initial version of the deleted file from a backup, or even block the file deletion operation itself. In another example, in response to generated indication that the user process 102 is malicious based on an execution stack 114 associated with the control point 110 for creating a remote thread, the file protector driver 103 may block importation of a dynamically linked library into the shared-service process 112 to prevent injection of malware into the shared-services process 112 (i.e., svchost.exe).

In some aspects, the file protector driver 103 may further transmit the stack of the malicious process to a remote server for further analysis and study. The result of such analysis and study may be incorporated back into the first malware detector 104 and the second malware detector 116 to more accurately identify suspicious and malicious processes and programs. For example, the second malware detector 116 may receive one or more updates to its heuristics database. Such updates can thus modify the second malware detector 116 to generate improved predictions of whether subsequent execution stacks are classified as malicious activity.

In some aspects, the file protector driver 103 can be implemented as filesystem filter drivers, which are kernel-mode components that run as part of the operating system 105. Filesystem filter drivers may be configured to extend functionality of or modify the behavior of a file system. A filesystem filter driver can filter I/O operations for one or more file systems or file system volumes. An I/O operation in a file request can be processed by different filesystem filter drivers in a particular sequence (e.g., an order as defined by a storage stack of the operating system 105). In some aspects, the file protector driver 103 may be attached to one or more mounted volumes of a storage device in computer hardware 106 that has been designated (e.g., by an administrator) for protection from malware, and filters all I/O operations on them. In another aspect, the file protector driver 103 may be implemented as a software service or module executing on the operating system 105 as a client of a volume/disk filter manager that acts on its behalf within a filesystem filter driver.

In some aspects, the first malware detector 104 and the second malware detector 116 are implemented as a software service or machine learning module executing on the system 100. The machine learning modules of the first malware detector 104 and the second malware detector 116 may be implemented as a remote software service executing on another system (e.g., centralized service, third-party server, cloud-based service) and accessible by a network connection. In other embodiments, the machine learning modules of the first malware detector 104 and/or the second malware detector 116 can be implemented on hardware local to the file protector driver 103.

Figure 3:
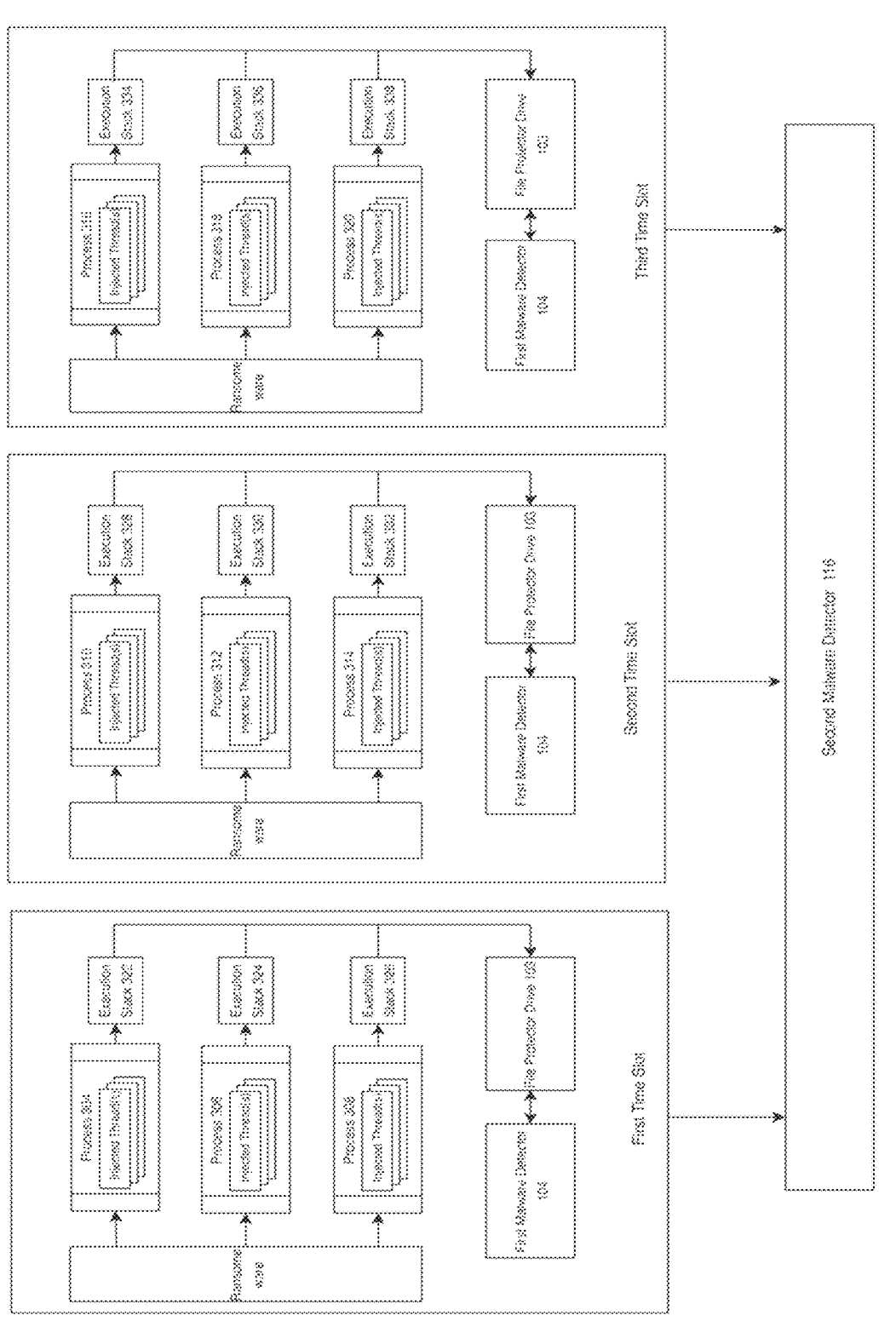
FIG. 3 is a block diagram of the system for detecting multiple malicious processes based on different time slots, in accordance with an embodiment.

Referring to FIG. 3 a block diagram of a system 300 for detecting multiple malicious processes is depicted, according to an embodiment. In contrast to FIGS. 1 and 2, in which the focus is on single target injections in which ransomware detects a single trusted process and injects code into it, FIG. 3 is directed to a variety of multi-target injectors, such as Ryuk. Ryuk is a crypto-ransomware that utilizes encryption to prevent access to a system or a file until a ransom is paid. Typically, to detect multi-target injectors, all processes in a system would need to be monitored. However, this is not possible because tracking all processes at all times demands computational resources that would lead to a degradation of system performance. Embodiments such as system 300 described herein solve this problem.

System 300 presents an exemplary aspect in which the first malware detector 104 is re-trained with a plurality of call stacks corresponding to different monitored operation types. The first malware detector 104 is based on a machine learning module, (e.g. a first machine learning module of the system), which is configured to generate a first verdict 113-A. When the first malware detector 104 is trained to detect a single injection, it is trained using a training set comprising a plurality of injectors and respective call stacks. Certain call stacks are "safe," implying that a process is non-malicious and other call stacks are labelled "malicious," implying that an injector has injected thread(s) into a process. The reason this technique may not be effective in identifying a multi-target injector is because one call stack considered in a vacuum may appear "safe," when in fact it is "malicious." It is not until another call stack is considered that the file protector driver 103 may determine that in combination, two or more processes are malicious.

The first malware detector 104, in accordance with an embodiment, is configured generate the first verdict with a plurality of call stacks corresponding to different monitored operation types. For example, in system 300, ransomware-.exe 302 injects threads into processes 304, 306, and 308. The three victim processes may correspond to a shared-service process or a user process (as shown in FIG. 1). The file protector driver 103 may receive, from each of the processes, a respective execution stack indicating at least one respective control point used to monitor at least one thread associated with the process. For example, the file protector driver 103 may receive execution stack 310 from process 304, execution stack 312 from process 306, and execution stack 314 from process 308.

The first malware detector 104 comprises the first machine learning module, for example a first ML classifier, that has been trained with a plurality of processes and execution stacks. For example, an input in the training dataset may be a plurality of execution stacks and a corresponding output may be a probabilistic estimate of the danger of the least one threads associated with each process. The training dataset may comprise a plurality of examples in which some inputs of execution stacks correspond to safe processes, some inputs of execution stacks correspond to malicious processes, and some inputs of execution stacks correspond to a combination of safe processes and malicious processes.

Accordingly, in response to receiving the execution stacks, the first malware detector 104 may determine that at least one of the processes is malicious by applying the machine learning classifier on execution stacks corresponding to the at least one control points of each process. In response to determining that at least one of the processes is potentially malicious, the first malware detector 104 generates the first verdict 113-A indicating that an execution of the at least one process is potentially malicious.

In terms of identifying which processes to monitor, the file protector driver 103 identifies processes based on a thread creation notification as identified by functions, such as PsSetCreateThreadNotify Routine. The PsSetCreateThreadNotify Routine is a routine that registers a driver-supplied callback that is notified when a new thread is created and when the thread is terminated. Accordingly, when ransomware.exe 302 injects a thread into process 304, the file protector driver 103 identifies the process as one to monitor. PsSetCreateThreadNotifyRoutine also allows for logically linking the ProcessId of an injecting party to the injected process victim, thus giving the attacker's identity.

The file protector driver 103 may also utilize user-mode hooking to intercept operations to catch various stages of a ransomware attack. User-mode hooking refers to recording system/API calls made by a process. User-mode hooks typically hook Win32 API (e.g., WriteProcessMemory, MapViewofFile, etc.). In view of this, the stages of attack may begin with CreateFile and may proceed to WriteProcessMemory. The file protector driver 103 may logically link these two actions if the injecting party's identification is the same amongst the two actions.

By utilizing PsSetCreateThreadNotify Routine as well as user-mode hooking, the file protector driver 103 avoids having to monitor all processes to evaluate the context of injections. Instead, the file protector driver 103 narrows its focus to certain triggers (e.g., the creation, modification, and termination of threads) and identifies processes to monitor accordingly. For example, a thread may be modified, created, or terminated in a particular process, which prompts the file protector driver 103 to monitor the process.

Consider an example in which only processes 304 and 306 are injected with a thread from ransomware.exe 302. The creation of a new thread triggers the file protector driver 103 to monitor processes 304 and 306. As mentioned previously, the file protector driver 103 may receive, from each of the processes, a respective execution stack indicating at least one respective control point used to monitor at least one thread associated with the process. For example, process 304 may be associated with at least one first control point and process 306 may be associated with least one second control point. These control points correspond to events comprising at least one of creating a file, cleaning up a file, closing a file, duplicating a handle, renaming a file, deleting a file, and creating another thread. Although it is possible that the above-mentioned events seem harmless when considered as standalone events, when considered in the context of events caused by multiple processes, the events may in fact be harmful. For example, execution stack 310 may indicate that the injected thread of process 304 has deleted an existing file and execution stack 312 may indicate that the injected thread of process 306 created a new file in place of the deleted file. Such determinations can be made, for example, within a threshold period of time in order to preserve computing resources.

In some aspects, the at least one first control point and the least one second control point are associated with a system call to create a remote thread that runs in a virtual address space of either the first process (e.g., process 304) or the second process (e.g., process 306). In some aspects, the second process comprises a shared-service process configured to import third-party processes to be embedded in the second process as separate threads. These third-party processes may also be malicious.

Continuing the previous example in which processes 304 and 306 are injected with malicious threads, the first malware detector 104 may apply the first ML classifier on each of the execution stacks 310 and 312 (which would both serve as one input of the classifier). Considering both execution stacks together, the first ML classifier may output a probability of each execution stack being associated with a malicious process. For example, the the the first ML classifier may determine that process 304 has a 90% likelihood of being malicious and process 306 has a 75% likelihood of being malicious. In some aspects, the file protector driver 103 may compare these respective probabilities with a threshold probability (e.g., 65%), which serves as a minimum likelihood for classifying that a process is in fact malicious. Because in this example both processes have a higher probability than the threshold probability, the file protector driver 103 may determine that both processes are malicious. In other embodiments, the threshold probability can be greater than 0%, 25%, 50%, 75%, 95% and other threshold percentage levels.

After the malicious process is identified, the first verdict 113-A and auxiliary information 113-B associated with the malicious process is provided to the second malware detector 116, in accordance with one embodiment. The auxiliary information 113-B includes File Input/Output (File I/O), Registry I/O data, Remote Procedure Call (RPC), Local Procedural Calls (LPC) data, scheduled tasks, Component Object Model (COM) servers data, network activity data, intercepted API data. For continuous monitoring, the execution stack related to each process is analyzed after a certain time period and the first verdict 113-A is generated. For example, during the first time slot, first verdict 113-A corresponding to processes 304, 306, and 308 is generated and auxiliary information 113-B related to the processes 304, 306 and 308 is provided to the second malware detector 116. After a predefined time interval, the second time slot is initiated, where the first verdict 113-A is generated for the processes 304, 306 and 308. The first verdict 113-A with the auxiliary information 113-B corresponding to the processes 304, 306, and 308 is provided to the second malware detector 116 during the second time slot. Similarly, the first verdict 113-A is generated again during the third time slot and the auxiliary information 113-B corresponding to processes 304, 306, and 308 is provided to the second malware detector 116.

In one aspect, the first verdicts 113-A generated during the first, second, and third time slots, respectively, are provided to the second malware detector 116 in a series. System 100 can therefore monitor the trusted processes, receive an execution stack corresponding to the time stamp, apply the first malware detector 104 and generate the first verdict 113-A according to a specific time interval based on pre-defined rules. In embodiments, the aforementioned operations can further be repeated based on a specific time interval based on predefined rules.

In one aspect, the predefined rules are based on various criterions. In one implementation, the predefined rules are based on control points 110. For example, a timestamp can be configured as a control point 110, and control point 110 can be a timestamp. A timestamp for collecting the execution stack can be predefined and configured as the control point 110. Upon detection of the control point 110, i.e., occurrence of scheduled timeslot, the execution stack for each trusted process is collected and analyzed by the first malware detector 104.

In another embodiment, the predefined rules are based on interval points by using APC (asynchronous procedure calls). In an embodiment using APC, every timestamp corresponds to interval point. A data slice for analysis, i.e., execution stack, is collected at the required timestamp.

For example, the timestamp can be a specific time interval, such as 10 or 20 seconds. After each time interval of 10 seconds, the execution stack corresponding to the respective process is collected for analysis. During first time slot, say 00:00:00, the execution stack 322 is collected from the process 304, the execution stack 324 is collected from the process 306, and the execution stack 326 is collected from the process 308. The first verdict 113-A is generated and timestamped at 00:00:00. After time interval of 10 seconds, at 00:00:10, the execution stack 322 is collected from the process 304, the execution stack 324 is collected from the process 306, and the execution stack 326 is collected from the process 308. The first verdict 113-A is generated and timestamped at 00:00:10. After additional time interval of 10 seconds, at 00:00:20, the execution stack 322 is collected from the process 304, the execution stack 324 is collected from the process 306, and the execution stack 326 is collected from the process 308. The first verdict 113-A is generated and timestamped at 00:00:20. All first verdicts are provided, along with the corresponding auxiliary information 113-B, in series based on the timestamps.

In yet another embodiment, the predefined rules are based on alternate APC methods, such as DLL injection with thread code modification.

According to an embodiment, based on the time-series inputs (the timestamped first verdicts), the second malware detector 116 generates a second verdict 116-A confirming the presence of the malware in the process. The third machine learning module of the second malware detector 116 can be a third ML classifier of the system. Accordingly, in some aspects, third machine learning module, such as third ML classifier, of the second malware detector 116 is configured to receive the auxiliary information 113-B from the first malware detector 104 to determine the remedial action 116-Bs, in response to the second verdict 116-A, and communicate with the file protector driver 103 which may perform remedial action 116-B(s), such as the restoration of a file modified/deleted by at least one first process and the second process and the termination of the first process and the second process.

Embodiments of the system are built on three machine learning modules. First ML classifier is used for the first malware detector 104 to generate the first verdict 113-A. The first verdict and auxiliary information is provided as input to the second malware detector 116. The second ML classifier is used for the second malware detector to generate the second verdict 116-A. Third ML classifier is used for the second malware detector to generate a remedial action 116-B, based on the second verdict 116-A and the auxiliary information 113-B.

Referring to FIG. 4, a flowchart of a method 400 for detecting a malware injection in a trusted process is depicted, in accordance with an embodiment.

At block 402, one or more trusted processes launched on a computing device are identified.

At block 404, at least one thread associated with the trusted processes from the identified one or more trusted processes is monitored using at least one control point.

At block 406, activity is detected on the at least one thread based on the at least one control point and a timestamp of the detected activity is determined.

At block 408, at least one execution stack corresponding to the timestamp is received from the trusted processes, and the at least one control point is indicated which is used to monitor the at least one thread.

At block 410, a first malware detector is applied to the at least one execution stack to generate a first verdict 113-A. The first verdict 113-A determines that the trusted process is potentially malicious.

At block 412, the first verdict 113-A and auxiliary information 113-B is collected corresponding to the trusted at the given timestamp.

At block 414, a second malware detector is applied to the first verdict 113-A and the auxiliary information 113-B to generate a second verdict 116-A: wherein the second verdict 116-A is indicative of presence of malware injection in the trusted process, identified as potentially malicious by the first malware detector.

The invention claimed is:

1. A computer-implemented method for detecting a malware injection in a trusted process, the method comprising:

identifying at least one trusted process launched on a computing device;

monitoring at least one thread associated with the at least one trusted process using at least one control point;

detecting activity at the at least one thread based on the at least one control point and determining a timestamp of the detected activity, wherein the timestamp corresponds to one of a plurality of scheduled timeslots at which the activity is detected;

receiving, from the at least one trusted process, at least one execution stack corresponding to the timestamp and indicating the at least one control point used to monitor the at least one thread;

applying a first machine learning module of a first malware detector to the at least one execution stack to generate a first verdict, wherein the first verdict determines that the trusted process is potentially malicious;

collecting the first verdict and auxiliary information corresponding to the at least one trusted process at the timestamp;

applying a second machine learning module of a second malware detector to the first verdict and the auxiliary information, such that the first verdict and the auxiliary information are inputs to the second machine learning module to generate a second verdict, wherein applying the second machine learning module of the second malware detector includes applying a machine learning classifier to the first verdict and the auxiliary information to infer the second verdict as a prediction using previous training of the machine learning classifier, and wherein the second verdict is indicative of presence of malware injection in the at least one trusted process; and repeating, each of the detecting activity, the receiving the at least one execution stack, the applying the first machine learning module, the collecting the first verdict and the auxiliary information, and the applying the second machine learning module for one or more threads associated with one or more trusted processes at a predefined frequency corresponding to respective scheduled timeslots of the plurality of scheduled timeslots thereby including a plurality of timestamps associated with respective scheduled timeslots, wherein each of the plurality of scheduled timeslots is determined according to at least one predefined rule, wherein each respective timestamp is associated with a respective first verdict, and wherein the respective timestamp and the respective first verdict are input to the second machine learning module, and the second verdict is based on the respective timestamp.

2. The method of claim 1, further including:

retraining the first malware detector to identify potential malware injection based on newly collected data corresponding to detected potential malware injections, wherein the first malware detector is based on the first machine learning module; and retraining the second malware detector to confirm the presence of malware injection based on newly collected data corresponding to confirmed malware injections, wherein the second malware detector is based on a second machine learning module.

3. The method of claim 1, further comprising providing the first verdict and auxiliary information corresponding to each of two or more trusted processes, from amongst the at least one trusted process, in a series, wherein the series is formed of an order of the timestamp corresponding to each trusted process.

4. The method of claim 1, wherein the method further comprises determining a remedial action, by applying a third machine learning module of the second malware detector to the auxiliary information and the second verdict, in response to the second verdict.

5. The method of claim 4, wherein the remedial action comprises at least one of file rollback, registry rollback, scheduled tasks rollback, remote registry rollback modified by the at least one trusted process and termination of the identified malicious process.

6. The method of claim 1, further comprising generating an alert to a user and providing the user with the second verdict and the collected auxiliary information to remediate files, file paths, scheduled tasks and registry data modified by the at least one trusted process.

7. The method of claim 1, wherein the auxiliary information includes at least one of File I/O, Registry I/O data, Remote Procedure Call (RPC) calls, Local Procedural Call (LPC) data, a scheduled task, Component Object Model (COM) server data, network activity data, and intercepted Application Programming Interface (API) data.

8. The method of claim 1, wherein the monitoring of the at least one thread associated with the at least one trusted process is performed using call stack trace monitoring, and the at least one control point is associated with at least one event comprising at least one of: create a file, clean up a file, close a file, duplicate a handle, rename a file, delete a file, create a thread, a registry operation, a Component Object Model (COM) operation, a Remote Procedure Call (RPC) call, and a Local Procedure Call (LPC) call.

9. The method of claim 1, wherein the respective scheduled timeslot is scheduled at an interval of 10 seconds.

10. The method of claim 1, further comprising:

identifying the process as malicious if the second verdict is higher than a first predefined threshold; and detecting a false positive if the second verdict of the malicious behavior of the at least one trusted processes is lower than a second predefined threshold.

11. A malware detection system configured to detect a malware injection in a trusted process, the system comprising:

a hardware processor implemented on a computing device; and instructions that, when executed by the hardware processor, cause the hardware processor to:

identify at least one trusted process launched on the computing device, monitor at least one thread associated with the at least one trusted process using at least one control point, detect activity at the at least one thread based on the at least one control point and determine a timestamp of the detected activity, wherein the timestamp corresponds to one of a plurality of scheduled timeslots at which the activity is detected, receive from the at least one trusted process at least one execution stack corresponding to the timestamp and indicating the at least one control point used to monitor the at least one thread, apply a first machine learning module of a first malware detector to the at least one execution stack to generate a first verdict, wherein the first verdict determines that the at least one trusted process is potentially malicious, collect the first verdict and auxiliary information corresponding to the at least one trusted process at the timestamp, apply a second machine learning module of a second malware detector to the first verdict and the auxiliary information, such that the first verdict and the auxiliary information are inputs to the second machine learning module to generate a second verdict wherein applying the second machine learning module of the second malware detector includes applying a machine learning classifier to the first verdict and the auxiliary information to infer the second verdict as a prediction using previous training of the machine learning classifier;

wherein the second verdict is indicative of presence of malware injection in the trusted process;

wherein the instructions further cause the hardware processor to repeat each of the instructions to detect activity, receive the at least one execution stack, apply the first machine learning module, collect the first verdict and the auxiliary information, and apply the second machine learning module for one or more threads associated with one or more trusted processes at a predefined frequency corresponding to respective scheduled timeslots of the plurality of scheduled timeslots, thereby including a plurality of timestamps associated with respective scheduled timeslots, wherein each of the plurality of scheduled timeslots is determined according to at least one predefined rule, wherein each respective timestamp is associated with a respective first verdict, and wherein the respective timestamp and the respective first verdict are input to the second machine learning module, and the second verdict is based on the respective timestamp.

12. The system of claim 11, wherein the instructions further cause the hardware processor to:

retrain the first malware detector to identify potential malware injection based on newly collected data corresponding to detected potential malware injections, wherein the first malware detector is based on the first machine learning module; and retrain the second malware detector to confirm the presence of malware injection based on newly collected data corresponding to confirmed malware injections, wherein the second malware detector is based on the second machine learning module.

13. The system of claim 11, wherein the first verdict and auxiliary information corresponding to each of two or more trusted processes, from amongst the at least one trusted process, are provided to the second malware detector in a series, wherein the series is formed of an order of the timestamp corresponding to each trusted process.

14. The system of claim 11, wherein the instructions further cause the hardware processor to: determine a remedial action, in response to the second verdict, by applying a third machine learning module of the second malware detector to the auxiliary information and the second verdict.

15. The system of claim 14, wherein the remedial action comprises at least one of file rollback, registry rollback, scheduled tasks rollback, remote registry rollback modified by the at least one trusted process and termination of the identified malicious process.

16. The system of claim 11, wherein the instructions further cause the hardware processor to:

generate an alert for a user; and provide the user with the second verdict and the collected auxiliary information to remediate files, file paths, scheduled tasks and registry data modified by the at least one trusted process.

17. The system of claim 11, wherein the auxiliary information includes at least one of File I/O, Registry I/O data, Remote Procedure Call (RPC) call data, Local Procedure Call (LPC) data, a scheduled task, Component Object Model (COM) server data, network activity data, and intercepted Application Programming Interface (API) data.

18. The system of claim 11, wherein the monitoring of the at least one thread associated with the at least one trusted process is performed using call stack trace monitoring, and the at least one control point is associated with at least one event comprising at least one of: create a file, clean up a file, close a file, duplicate a handle, rename a file, delete a file, create a thread, registry operations, a Component Object Model (COM) operation, a Remote Procedure Call (RPC) call, and a Local Procedure Call (LPC) call.

19. The system of claim 11, wherein the instructions further cause the hardware processor to:

identify the process as malicious if the second verdict is higher than a first predefined threshold; and detect a false positive if the second verdict of the malicious behavior of the at least one trusted process is lower than a second predefined threshold.

20. The system of claim 11, wherein the respective scheduled timeslot is scheduled at an interval of 10 seconds.

* * * * *